May 28, 1929.   G. B. WADSWORTH   1,715,108
ELECTRIC SWITCH
Filed March 23, 1922   3 Sheets-Sheet 1
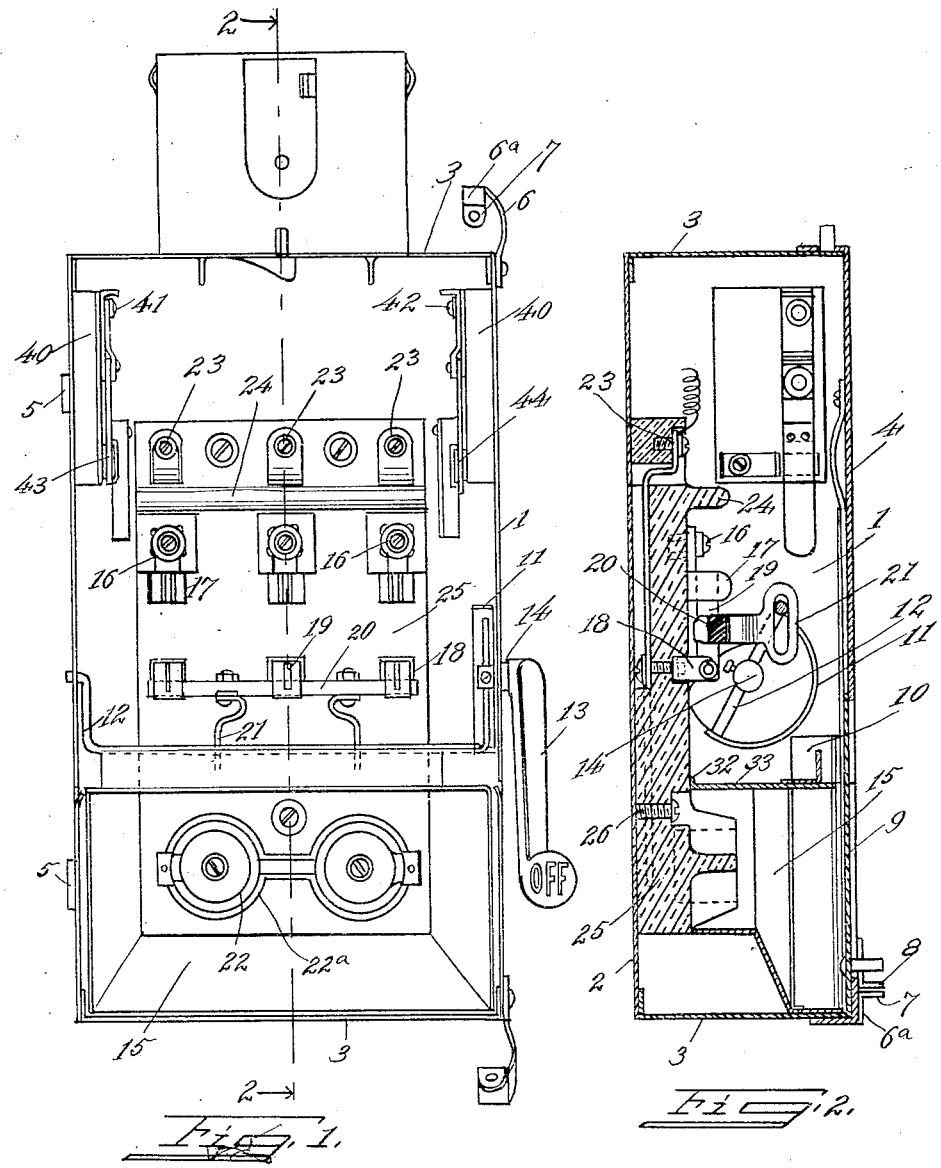
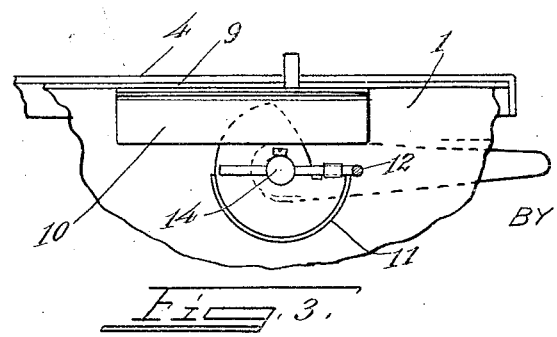
INVENTOR:
George B Wadsworth
BY
Allen + Allen
ATTORNEYS.

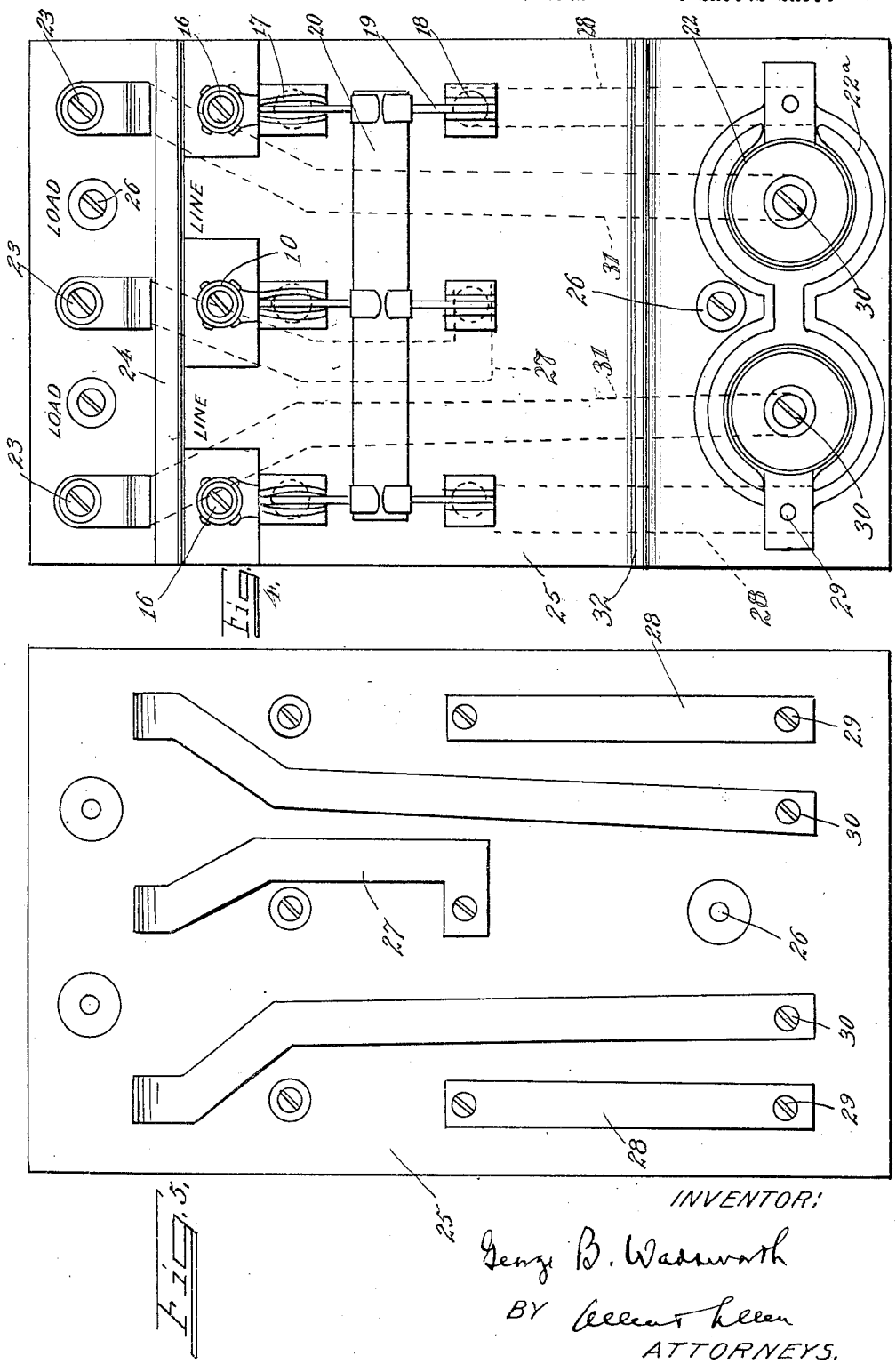

May 28, 1929.  G. B. WADSWORTH  1,715,108
ELECTRIC SWITCH
Filed March 23, 1922   3 Sheets-Sheet 3

INVENTOR:
George B. Wadsworth
BY
ATTORNEYS.

Patented May 28, 1929.

1,715,108

UNITED STATES PATENT OFFICE.

GEORGE B. WADSWORTH, OF COVINGTON, KENTUCKY, ASSIGNOR TO THE WADSWORTH ELECTRIC MANUFACTURING COMPANY, OF COVINGTON, KENTUCKY, A CORPORATION OF KENTUCKY.

ELECTRIC SWITCH.

Application filed March 23, 1922. Serial No. 546,127.

My invention relates to electric switches of the enclosed cabinet type, in which contact with live wire parts is prevented, and access of fuses for replacement is arranged for without possibility of access to live switch contacts.

There are various types of switches of the character briefly above set forth shown in patents of the prior art, and a few switches of said type on the market today, but generally speaking the wiring difficulties, meter testing difficulties, and the like, have so militated against the installation of such boxes that they have not been a commercial success.

It is the primary object of my invention to provide for switch and fuse parts internally of a switch cabinet, such that the above difficulties are done away with and this without added expense of construction. The cabinet parts and fuse compartment opening device in connection with the switch are substantially those of my co-pending application, Serial No. 350,268, filed January 9, 1920, to which reference is hereby made.

More specifically it is my object to provide a base for a cabinet switch, said base being readily applicable to any kind of electric switches in which the line wires and load wires have their points of attachment to the base located entirely in the one end of the base. In addition, one of my particular objects is to provide a meter test switch outfit mounted in the cabinet and operating in a simple, convenient, and safe manner.

In connection with the switch and fuse base, I provide means for supporting a barrier within the switch cabinet and for means of bringing the line and load terminals very close together without over-riding the rules relating to the spacing apart thereof.

In the drawings,

Figure 1 is a plan view of a switch cabinet containing the various features of my invention, with the lid removed or hinged back.

Figure 2 is a central vertical section on the line 2—2 of Figure 1.

Figure 3 is a detail side elevation of the fuse door closure enforcing means.

Figure 4 is a plan view of the exposed portions of my switch and fuse base parts thereon.

Figure 5 is a bottom plan view of the said base and its strapped connections.

Figure 6:
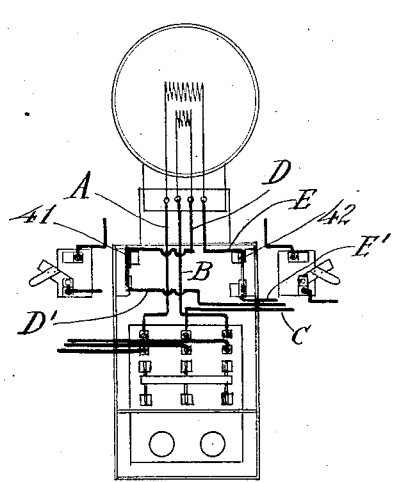
Figure 6 is a partially diagrammatic view showing the meter test switch connections for use with my device.

Referring first to the cabinet, it will be noted that I provide a metallic box having sides 1 and base 2, and ends 3, 3. A lid or cover 4 is preferably hinged at 5 to the sides of the box, and, when closed, locked in place by clips 6. These clips are riveted to the sides of the box and have ends 6$^a$ which swing over the lid, said ends having ears 7 which are sealed or padlocked to ears 8 on the lid. Sliding on the under side of this lid is a shutter 9, which controls access through an opening in the lid.

A web 10 depends from the shutter and is interfered with by a semi-circular piece of sheet metal 11 mounted on the switch operating bail 12. The bail 12 is thrust into a hole in one side of the box. A handle 13 is provided having a hub 14 thrust into the other side of the box, and the remaining end of the bail 12 is thrust through the handle hub inside of the box. The semi-circular piece noted is secured to the bail, and when the switch is in closed position the circular portion interferes with the web on the shutter, preventing its movement to give access through the lid opening to the fuses. When the switch is open and the shutter moved upwardly (in this case), the web lies over the non-circular portion of the member 11, preventing movements tending to close the switch.

A sheet metal hopper 15 is set into the box engaging a groove or other projections or indentations of the switch and fuse base (as will be noted), this hopper preventing access to the switch portions within the box from the opening that lets into the said hopper through the lid. As will be noted the hopper comes down closely around the fuses and leaves them exposed.

Referring next to the switch and fuse base it should first be noted that there is provided a unitary block 25 of porcelain, slate or other insulating material, in which are mounted the various current carrying parts of the device, This block is screwed down in the box by screws 26.

The switch is a knife blade type having line terminals 16, 16, screwed into the base and connected direct to the forks 17, 17. The forks 17, 17, are secured in the base. Pivotally secured to the bodies of the load forks 18 are the switch blades 19 interconnected by the fibre bar 20. Thus by swinging down the fibre bar the switch is closed, and swinging it up the switch is opened.

To operate the blade device a pair of metallic loops 21, 21, are secured thereto at equal distances from the center of the fibre bar, these loops engaging over the bail, so as to permit a full right angle of movement of the switch blade and give additional free movement to the bail, so that a full closure of the switch is provided prior to possible movement on part of the fuse disclosing shutter.

The fuses (in this instance plug type) are set in shells 22 screwed to the cups 22$^a$ in the base below the switch (in this instance). A three-pole switch is shown, although any number of poles can be used. In three-pole switches I have made a departure, however, since I require but two fuses for such installations.

The load terminals 23 are secured in the base just above the line terminals and a high rib 24 formed in the base 25 separates the two sets of terminals. This requires for a spark to jump for it to travel over the top of the rib, thereby gaining enough spacing between the terminals to satisfy underwriters' requirements without unduly extending the length of the base.

On the underside of the switch base in an entirely inaccessible place from the exposed parts are various channels formed, in which conductor straps are mounted, thereby avoiding all tedious wiring of the switch and permitting the wires to the meter or service to pass out through the box from the same that the line wires enter.

In the first place in a three-wire installation there is the strap 27 passing through its channel from the central or neutral line terminal to the neutral load terminal. This makes unnecessary any wires to the fuse portions of the switch and avoids the danger of insertion of a fuse in the neutral line. As is well known it is bad practice to provide a neutral fuse since if an unbalanced number of devices in service will tend to cause it to blow, and when it blows any light bulbs, motor windings or the like, will receive double voltage, which, in most cases, will destroy them.

From the switch terminals direct connected to the blades there are straps 28, which run to the screws 29 for the one side of the fuses, and from the screws 30 at the other side of the fuses there are straps 31, which run to the load terminals, other than the neutral.

Suitable sealing wax is poured over the straps after they are set in the channels and connected up, all of which is done at the factory, so that the men installing a switch cabinet merely swing open the door, connect the line wire to the line terminals, and the load wires to the load terminals.

This results in a great saving of time and in increased safety over any previous methods of wiring up a switch, wherein the switch is connected into the line ahead of the fuses, or for that matter in any case where the fuses and switch are in the same block or base.

It will be noted of the present form of base that a channel 32 is formed therein adapted to receive the one edge 33 of the fuse confining hopper 15. The hopper has four sides in the present instance, and small tongues or knobs turned or struck in from the sides of the box serve to space it away to permit passage of the shutter web. The hopper comes up close enough to the lid, when closed, so that no small wire can be thrust above it to steal current from the switch terminals.

It is a decided advantage to have the fuses below the switch, since small pieces of dust and dirt gaining access to the box through the fuse opening will not settle on the switch parts.

Referring to the meter testing portion of my switch, it is to be noted that two small switches are set on suitable bases 40 secured in the sides of the box above the switch and fuse base. These switches comprise terminals 41, 42, for meter connection, and terminals 43, 44, for connection to the load terminals of the base and to the consumer's load.

The blades 43 hinged at the terminals 42 swing vertically from the bottom of the box, so as to lie in a position, when open, to prevent the closure of the box lid.

The wiring of the test switches is as follows:—A line A from the one switch base load terminal runs to the meter 44, a line B from the other outside load terminals runs to the meter. The neutral terminal has its line C run to the consumer's load. From the opposite terminals of the meter a line D runs to the test switch terminal 41, and a line E to the terminal 42 of the other test switch. Wires D$^1$ and E$^1$ run from the terminals 43 and 44, respectively, to the customer's load.

By opening up the box and throwing up the switches, the customer's service is discontinued, and the tester can connect his wires to the terminals 41 and 42, and run a test on the meter without disconnecting the usual meter connections from the line through the switch. If the customer's service is to be continued, the tester places straps across between the terminals 43 and 44, and the two outer terminals of the switch base.

Figure 7:
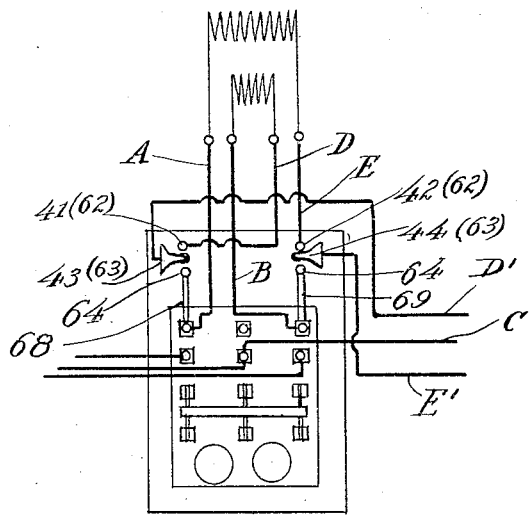
Figure 7 is a partially diagrammatic view showing another method of wiring up a cabinet for testing.
Figure 8:
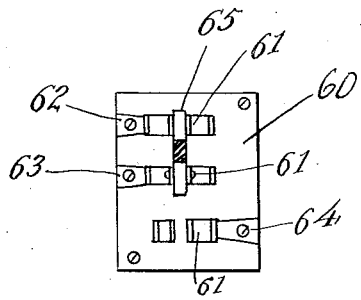
Figure 8 is a plan view of a modified test switch for use with the said wiring.
Figure 9:
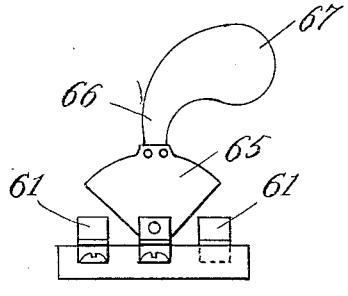
Figure 9 is a side elevation of said modified test switch.

As shown in Figures 7, 8 and 9, the test switch and wiring is substantially the same as that above described, except that the switch is different and the straps from the switch base terminals are permanent.

Thus the test switches in this modification are formed with bases 60 and three sets of forks 61, each having terminals 62, 63, and 64 connected thereto. The switch blade is formed of a segmental piece 65 pivoted in the central fork and made on a large enough arc so that when swung into a purely central position it will connect all three terminals, but when thrown clear up or clear down, will connect the central terminal with the two end terminals, as in a double throw switch.

With this form of test switch the base is set on the back of the box instead of the sides, and the handle 66 to the segment-shaped blade will swing up into a position to block a closing of the door, unless it is fully depressed with the rounded end 67 thereof down toward the bottom of the box. This position will be the usual meter load operating condition.

Thus the use of the same reference numerals for the terminals 41, 42, 43 and 44 will be evident, and the extra or third terminals 64 of the two switches are strapped permanently to the two outside load terminals of the switch base, as by straps 68 and 69, respectively.

The result of this construction is that the meter tester may open the lid of the box and throw the customer's load from a connection through the meter to a connection free of the meter, without cutting out his current even for an instant. The advantage of this is that any electrical devices, such as motor starting switches, which automatically throw themselves off when the voltage drops on the line, will not be put out of action during the act of cutting the meter out of the line.

The switch blade handle is such that it is impossible to close the box and leave the customer in position to take current free of the motor, since in each case the terminals 68 and 69 will leave the extra rounded end of the handle in position to block shutting of the cabinet lid.

Without disconnecting the central wires of the test switches, the customer cannot be cut out of current, by a careless operator. It may be noted that to effect the above mode of operation it is necessary to connect the customer's load to the central terminals, since they are always in connection with the electrical power, either through the meter or direct from the switch base terminals.

It makes no difference whether the line or load terminals are connected by the straps 68 and 69, except that where the line terminals are connected, the customer gets no fuse protection. It should be noted that in switches where the fuses are inserted in the line ahead of the switch, this last contingency would not be present.

I do not desire, because of failure to mention equivalent structures in the above description, to be limited in the claims that follow to the specific electrical and mechanical structures set forth, without application of the doctrine of equivalents in the interpretation of said claims.

Having thus described my invention, what I claim as new and desire to secure by Letters Patent, is:—

1. In combination, an enclosed meter entrance cabinet, an insulating base within the cabinet, a cover for the cabinet provided with an opening, line, load and meter connection terminals located substantially at one end of the base, fuse receptacles located substantially at the opposite end of the base, a switch mounted on said base, connection straps on the under side of said base and comprising all of the connections between the several terminals, the switch and the receptacles, and barrier means adjacent the fuses and extending substantially between the base and the opening in the cover, whereby access may be had only to the fuses when the cover is closed.

2. In combination, an enclosed meter entrance cabinet, an insulating base within the cabinet, a cover for the cabinet provided with an opening, line, load and meter connection terminals located substantially at one end of the base, fuse receptacles located substantially at the opposite end of the base, a switch mounted on said base, connection straps on the under side of the base and comprising all of the connections between the several terminals, the switch and the receptacles, and barrier means adjacent the fuses and extending substantially between the base and the opening in the cover, whereby access may be had only to the fuses when the cover is closed, said terminals, other than the fuse receptacles, being located at that side of the barrier at which the cabinet is to be equipped with a meter.

3. In combination, an enclosed meter entrance cabinet, an insulating base within the cabinet, a cover for the cabinet provided with an opening, line, load and meter connection terminals located substantially at one end of the base, fuse receptacles located substantially at the opposite end of the base, a switch mounted on said base, connection straps on the under side of the base and comprising all of the connections between the several terminals, the switch and the receptacles, and barrier means adjacent the fuses and extending substantially between the base and the opening in the cover, whereby access may be had only to the fuses when the cover is closed, said line terminals being arranged in a zone across the said base, and said load terminals in another zone, and a ridge in said base separating said two zones of terminals.

GEORGE B. WADSWORTH.